United States Patent [19]

Meli et al.

[11] Patent Number: 5,440,860
[45] Date of Patent: * Aug. 15, 1995

[54] METHOD AND APPARATUS FOR FORMING AND HERMETICALLY SEALING SLICES OF FOOD ITEMS

[75] Inventors: Vincent Meli, Green Bay; Michael A. Matharani, DePere; Ted A. Brzezinski, Green Bay; David L. Shaft, Green Bay; James L. Urmanski, Green Bay, all of Wis.

[73] Assignee: Schreiber Foods, Inc., Green Bay, Wis.

[*] Notice: The portion of the term of this patent subsequent to May 12, 2009 has been disclaimed.

[21] Appl. No.: 98,752

[22] Filed: Jul. 28, 1993

Related U.S. Application Data

[63] Continuation of Ser. No. 791,490, Nov. 12, 1991, abandoned, which is a continuation-in-part of Ser. No. 644,481, Jan. 18, 1991, Pat. No. 5,114,307, which is a continuation of Ser. No. 361,405, Jun. 5, 1989, abandoned.

[51] Int. Cl.⁶ .......................... B65B 7/02; B65B 9/06; B65B 51/10
[52] U.S. Cl. .......................... 53/451; 53/477; 53/122; 53/551; 53/374.5; 426/130; 426/414
[58] Field of Search .......................... 53/122, 373.8, 374.2, 53/374.4, 374.6, 436, 477, 481, 451, 455, 551, 562, 526, 374.5; 426/130, 392, 410, 414

[56] References Cited

U.S. PATENT DOCUMENTS

| | | |
|---|---|---|
| 1,546,963 | 7/1925 | Bierbaum . |
| 2,133,348 | 10/1938 | Ferenci . |
| 2,134,862 | 11/1938 | Dunnam . |
| 2,156,466 | 5/1939 | Vogt . |
| 2,160,367 | 5/1939 | Maxfield ........................ 53/551 X |
| 2,460,460 | 2/1949 | Langer ........................ 53/477 X |
| 2,505,603 | 4/1950 | Brandenberger . |
| 2,529,732 | 11/1950 | Howard ........................ 53/551 |
| 2,613,488 | 10/1952 | Attride . |
| 2,759,308 | 8/1956 | Nawrocki . |
| 3,001,348 | 9/1961 | Rado ........................ 53/374.6 X |
| 3,140,572 | 7/1964 | Petersen et al. . |
| 3,182,430 | 5/1965 | Hoeppner ........................ 53/455 |
| 3,202,302 | 8/1965 | Insolio . |
| 3,300,944 | 1/1967 | Thesing . |
| 3,325,961 | 6/1967 | Lindh et al. . |
| 3,327,367 | 3/1966 | Fievet . |

(List continued on next page.)

FOREIGN PATENT DOCUMENTS

| | | |
|---|---|---|
| 0138044 | 4/1985 | European Pat. Off. . |
| 1027124 | 3/1958 | Germany . |
| 1124865 | 3/1962 | Germany . |
| 1146431 | 3/1963 | Germany . |
| 35551 | 11/1965 | Germany . |
| 1586328 | 1/1971 | Germany . |
| 3439680 | 5/1985 | Germany . |
| 3841056 | 6/1989 | Germany . |
| 3841945 | 7/1989 | Germany . |
| 94157 | 6/1959 | Netherlands . |
| 587751 | 5/1977 | Switzerland . |
| 709966 | 6/1954 | United Kingdom . |
| 1004097 | 9/1965 | United Kingdom . |
| 1366798 | 9/1974 | United Kingdom . |
| 91/02461 | 3/1991 | WIPO . |

*Primary Examiner*—Linda Johnson
*Attorney, Agent, or Firm*—Niro, Scavone, Haller & Niro

[57] ABSTRACT

An apparatus and method are provided for forming a hermetically sealed package for a slice of a food item. A web of thermoplastic material is first formed into a tubular arrangement with a hermetic longitudinal seal. To form the tubular arrangement, means are provided for folding a continuous web of thermoplastic material into V-folded condition and for continuously forming a hermetic seal along the open longitudinal edge of the V-folded web. The hermetic seal is formed between the inner surfaces of the front and rear faces of the web to define a tubular web member. The food item which has been formed into a soft mass, is then inserted into the tubular member and the tubular member is flattened to form a thin film tube. Means are provided for forming a hermetically sealed cross-seal which are disposed substantially transverse to the longitudinal forward moving direction of the web.

13 Claims, 5 Drawing Sheets

U.S. PATENT DOCUMENTS

| | | |
|---|---|---|
| 3,378,988 | 4/1968 | McClosky .......................... 53/551 |
| 3,388,525 | 6/1968 | Thesing et al. . |
| 3,395,915 | 8/1968 | Clausen et al. . |
| 3,405,861 | 10/1968 | Bush . |
| 3,436,927 | 4/1969 | Gruber . |
| 3,469,363 | 9/1969 | Berckmoes . |
| 3,498,019 | 3/1970 | Rait . |
| 3,532,516 | 10/1970 | Erekson . |
| 3,542,570 | 11/1970 | Bush et al. ...................... 53/451 X |
| 3,544,340 | 12/1970 | Miller et al. . |
| 3,592,329 | 7/1971 | Fleischauer . |
| 3,598,615 | 8/1971 | Chamberlain . |
| 3,623,653 | 11/1971 | Work . |
| 3,623,891 | 11/1971 | Coffey . |
| 3,634,099 | 1/1972 | Wilson . |
| 3,688,468 | 9/1972 | Erekson . |
| 3,693,319 | 9/1972 | Hunsader . |
| 3,838,549 | 10/1974 | Pepmeier . |
| 3,848,757 | 11/1974 | Jordan . |
| 3,851,068 | 11/1974 | Kraft . |
| 3,913,299 | 10/1975 | Stenstrom . |
| 3,924,051 | 12/1975 | Wiggins et al. . |
| 3,930,350 | 1/1976 | Reid . |
| 4,015,021 | 3/1977 | Harima et al. . |
| 4,074,504 | 2/1978 | Greenwalt et al. . |
| 4,106,265 | 8/1978 | Aterianus . |
| 4,139,978 | 2/1979 | Jensen et al. . |
| 4,183,964 | 1/1980 | Vinokur . |
| 4,199,919 | 4/1980 | Moscatelli . |
| 4,205,504 | 6/1980 | Gregoire et al. . |
| 4,262,473 | 4/1981 | Brooke . |
| 4,299,075 | 11/1981 | Gram . |
| 4,426,401 | 1/1984 | Ottow et al. . |
| 4,437,853 | 3/1984 | Metz . |
| 4,467,589 | 8/1984 | van Maanen . |
| 4,506,494 | 3/1985 | Shimoyama et al. . |
| 4,524,567 | 6/1985 | Patelli . |
| 4,530,632 | 7/1985 | Sela . |
| 4,543,769 | 10/1985 | Schmitz . |
| 4,586,317 | 5/1986 | Bussell .......................... 53/451 |
| 4,599,850 | 7/1986 | Kopp . |
| 4,620,826 | 11/1986 | Rubio et al. . |
| 4,630,426 | 12/1986 | Genrty . |
| 4,637,199 | 1/1987 | Steck et al. .................. 53/551 X |
| 4,712,357 | 12/1987 | Crawford et al. . |
| 4,745,731 | 5/1988 | Talbott et al. . |
| 4,759,170 | 7/1988 | Sawa et al. . |
| 4,792,457 | 12/1988 | Brna et al. . |
| 4,807,426 | 2/1989 | Smith . |
| 4,876,842 | 10/1989 | Ausnit . |
| 4,907,393 | 3/1990 | Omori et al. . |
| 4,947,623 | 8/1990 | Saito et al. . |
| 4,949,846 | 8/1990 | Lakey . |
| 5,053,239 | 10/1991 | Vanhatalo et al. . |
| 5,056,295 | 10/1991 | Williams . |
| 5,112,632 | 5/1992 | Meli et al. .................... 53/451 X |

FIG_8_

FIG_9_

METHOD AND APPARATUS FOR FORMING AND HERMETICALLY SEALING SLICES OF FOOD ITEMS

This application is a continuation of application Ser. No. 07/791,490, filed Nov. 12, 1991 now abandoned; which is a continuation-in-part of application Ser. No. 07/644,481, filed Jan. 18, 1991, now U.S. Pat. No. 5,114,307 which is a continuation of application Ser. No. 07/361,405, filed Jun. 5, 1989, abandoned.

BACKGROUND OF THE INVENTION

The present invention relates generally to an apparatus and method for packaging food items and more particularly to an apparatus and process for packaging and stacking food items in hermetically sealed individual slices.

Various methods and apparatus have been proposed and utilized for the manufacture and packaging of individual slices of food items such as cheese. Although the available apparatus and methods are suitable for the packaging of individual slices, they are not without disadvantages.

Typically, the package for the individual slices is formed from a continuous film or web of a thermoplastic material. The web is first folded in V-folded condition. As used herein, the term V-folded condition refers to a length of material which has been folded over onto itself so as to form what may subsequently be identified as a front sheet and a rear sheet which are joined by the fold at the bottom, so as to approximate the letter "V" in cross section. The web is typically folded such that the rear sheet is longer than the front sheet to define a flap section in the rear sheet, which extends beyond the top edge of the front sheet. The flap section is typically folded over onto the front sheet to form a tubular web.

After the flap is folded over on the front sheet, a tubular web is defined. The processed cheese is then inserted into the tube and the web and cheese are flattened. Subsequently cross-seals are formed along the longitudinal length of the tubular web at predetermined intervals. After the tube is cross-sealed it is severed along the cross-seals in order to produce the individually wrapped slices of cheese. Several processes presently exist for providing the transverse or cross seal.

In one commonly used method, the cross-seals are formed by subjecting the flattened web (with the inserted cheese) to pressure, at the desired location, to form the transverse cross seal. The pressure is applied such that an ultra thin layer or film of cheese is left in the transverse sealing section. The ultra thin layer or film of cheese acts as an adhesive to seal the two layers of the plastic web together. After this "cheese" seal has been formed, the web is severed at the sealed sections to define individual slices of cheese.

Although the "cheese" seal provides an adequate seal for the individual slices of cheese, the shelf life of the cheese product after it is packaged is not as long as would be desirable. This is due to the fact that the cheese seal is a relatively weak seal which will eventually deteriorate and which allows air to enter into the slices under ordinary atmospheric conditions. The slices will soon dry out or spoil.

Other methods of providing a transverse cross-seal have also been disclosed. For example, U.S. Pat. No. 4,586,317 (Bussell) discloses an arrangement for forming a seal in packaging material (such as processed cheese) which utilizes a sealing element having a finite number of small channels in the surface. The packaging film is co-extruded or laminated to include an inner sealing layer of relatively low thermal plastic melt temperature and an outer layer which does not melt under sealing conditions. The tube is heated and compressed transversely by the sealing elements thereby sealing the internal layers of the packaging film together. Although the apparatus and method disclosed in this patent provide a suitable cross-seal, the finished product suffers from the same disadvantages that are described above. Since the longitudinal seal is formed by providing a flap in the V-folded condition web and simply overlapping the flap with the upper surface of the front sheet of the web, a poor seal is formed. Thus, air and other atmospheric products will enter into the wrapped slices of cheese, reducing the shelf life of the product.

Therefore it would be desirable to provide an individual slice of cheese which is wrapped in a package which is hermetically sealed on all sides. To accomplish this, a hermetic seal must be formed along the longitudinal edge of the web as well as along the transverse or cross-seals. A hermetically sealed package would have several advantages. For example, a hermetically sealed slice would permit immersion for cooling and sanitizing. Further, a hermetically sealed slice is essential to aseptic packaging.

For purposes of manufacturing economy, it would be desirable to provide the longitudinal seal and cross-seals in a continuous process. Some presently available methods, however, form seals in an intermittent fashion. Typically, in these presently available methods, a seal is formed by heated jaws which reciprocate between an open and a closed position. When the jaws close, they seal the desired section of the web. After the section has been sealed, the jaws retract and the web is moved for the next section which is to be sealed. This process, however, has obvious disadvantages. The web must be continuously stopped and started in accordance with the reciprocating movement of the jaws. Such a device is disclosed for example in U.S. Pat. No. 2,460,460 (Langer).

Another problem which is encountered in the processing and packaging of cheese slices (as well as in the packaging of other products which are packaged in slices) is the lack of an available simple and efficient stacking process. Typically the stacking of slices into packages containing a plurality of slices is performed by an operator or a stacking machine. The available stacking machines, however, do not provide the required degree of efficiency and precision in the packaging of different stacks of cheese. It would be desirable to provide a stacking arrangement or process which would permit slices from a single wrapping machine to be stacked in a plurality of different stacks. It would be even more desirable to provide an arrangement which would allow the operator to selectively vary the number of slices in the stacks from one stacking job to the next. Preferably the stacking arrangement will also accurately stack slices of cheese from a relatively fast production line in a plurality of different stacks.

Therefore, in view of the above, it is an object of the present invention to provide an apparatus and a method for producing individual slices of food items, such as processed cheese, which are hermetically packaged.

It is a further object of the present invention to provide an apparatus and method for providing a continuous and efficient arrangement for forming hermetic seals along all of the edges of the packaging web.

It is still a further object of the present invention to provide an apparatus and method for stacking the desired number of the slices of food items, such as cheese, in the stacking locations from a rapid packaging system.

SUMMARY OF THE INVENTION

To achieve the foregoing and other objects and in accordance with the purposes of the present invention, an apparatus and method are provided for forming a hermetically sealed package for a slice of a food item. A web of thermoplastic material is first formed into a tubular arrangement with a hermetic longitudinal seal. To form the tubular arrangement, means are provided for folding a continuous web of thermoplastic material into V-folded condition and for continuously forming a hermetic seal along the open longitudinal edge of the V-folded web. The hermetic seal is formed between the inner surfaces of the front and rear faces of the web to define a tubular web member. The cheese which has been formed into a soft mass, is then inserted into the tubular member and the tubular member is flattened to form a continuous web. Means are provided for forming hermetically sealed cross-seals which are disposed substantially transverse to the longitudinal forward moving direction of the web.

In a preferred embodiment of the invention the means for forming the longitudinal seal include a pair of stationary plates with opposed undulating surfaces. The plates are arranged such that a fixed predetermined distance is defined between the undulating surfaces of the plates. The plates are heated and the web is passed through the space between the two plates. As the web moves through the plates, the undulating surfaces alternatively force the front and rear faces of the web into intimate contact with each other to thereby form a hermetic longitudinal seal without clamping the film between the surfaces.

In another aspect of the invention, a stacker is provided for stacking the slices from the wrapping and cutting machines into a plurality of stacks. The stacker includes a conveyor belt, which includes a plurality of apertures, onto which the slices of cheese are disposed. A vacuum system provides vacuum through the apertures to hold the slices of cheese on the belt. Means are provided for moving the belt in order to advance the slices of cheese to the stacking locations. The vacuum is sufficient to hold the slices of cheese on the belt even when the slices are disposed on the bottom of the belt. A plurality of stacking locations are sequentially provided. Each of the stacking locations includes means for providing positive air pressure at the leading edge of the cheese slice as it approaches each stacking location while it is being moved on the belt. As the cheese travels on the belt, the positive air pressure overrides the vacuum forces holding the slice on the belt thereby "peeling" the cheese slice off of the belt and the force of gravity causes the slice of cheese to fall into the predetermined stacking location. In a preferred embodiment, means are provided for selectively engaging or disengaging the positive air pressure at the leading edge of each stacking location. This stacking arrangement thus provides an apparatus for stacking a predetermined number of wrapped cheese slices being produced at a relatively rapid production rate into a plurality of stacks.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

DETAILED DESCRIPTION OF THE PRESENTLY PREFERRED EMBODIMENTS

Figure 1:
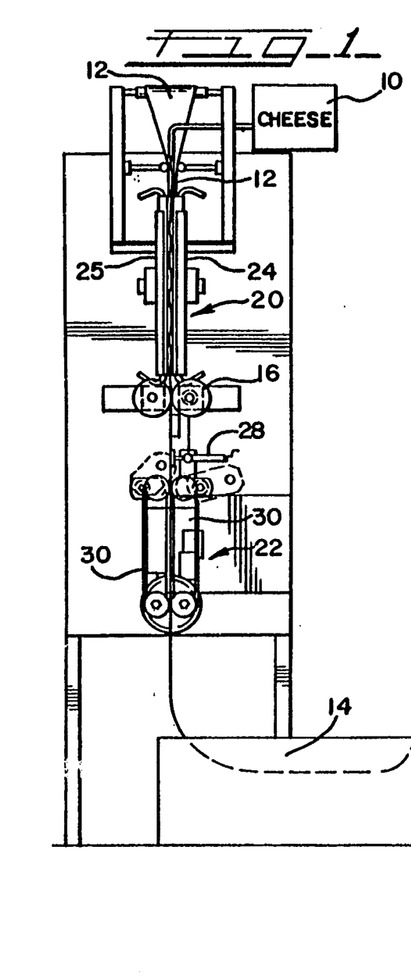
FIG. 1 is a schematic representation of a preferred embodiment of the apparatus and method of the present invention including the longitudinal sealer, the cross sealer, and the stacker.

Reference will now be made to the drawings wherein like elements are referred to with like reference numerals throughout the various drawings. Referring specifically to FIG. 1, a preferred embodiment of the arrangement and process of the present invention including the longitudinal sealer, cross sealer, and the stacker is illustrated.

Cheese is first processed, in a manner known in the art, by cheese processing means 10. The processed cheese is then transferred, in a known manner, from the cheese processing means 10 into a fill tube arrangement 12 which is used to insert the processed cheese into a tubular web made of thermoplastic material.

In more detail, the tubular web of thermoplastic material is formed by providing a continuous film or web of thermoplastic material and folding the web into V-folded condition, in a manner known in the art. After the web of thermoplastic material has been folded into the V-folded condition, a longitudinal seal is formed at a sealing station 20 (in a manner described in more detail below). Nip rollers 16 are provided to secure the seal and continuously pull the web of thermoplastic material. After the longitudinal seal is formed at the sealing station 20 and leaves the nip rolls 16, the cheese is inserted by means of the fill tube 12 into the tubular web. The web and cheese are then passed to a flattening station 22 (also described in more detail below). At the flattening station 22, the tubular web with the cheese is flattened to form a continuous web or slice of cheese.

After the web has been flattened and formed into the film, the web is then passed through a cooling station 14. In one preferred embodiment, the cooling station 14 comprises a tank or container for holding a cooling liquid, such as water. In this embodiment, the cooling station 14 may include a plurality of rollers such that the web and cheese are passed through the tank in a winding fashion. Preferably the cooling station 14 is configured such that the web with the cheese passes through the cooling water for approximately 20 seconds with the water being at between 32° F. and 50° F. This will take the cheese which usually starts off at a temperature of between 170° F. and 180° F. and cool the cheese down to approximately 50° F. at the exiting end of the cooling station 14. Preferably, the cooling station includes a roller which is over driven to provide means for keeping the web taut. The cooling station may also include scrapers and/or air-blowers (not shown) to dry the web as it exits from the cooling station 14. It will be recognized by those skilled in the art that other suitable cooling means may also be used.

After leaving the cooling station 14, the web is conveyed, preferably by a pair of driven feed belts 39, to the station which forms the cross seals. A loop control means and tensioning means 41 may be provided. The transverse or cross sealing station 40 includes a first member 42 with a plurality of heated jaws 46 and an opposed bottom member 44 with jaws 50 with opposed engaging surfaces. The cross sealing station 40 provides a hermetic seal 102 transverse to the longitudinal or forward moving direction of the web. The web now includes a plurality of slices of cheese 100 which are hermetically sealed. The cross sealing station 40 is described in more detail below.

After the transverse or cross seals have been formed, the web is then conveyed to a cutting station 60 to separate the individual slices of cheese 100. The station 60 includes means for cutting the web along the cross-seal to define the individual slices. The station 60 also preferably includes a stacking arrangement 70 which stacks the slices 100 being conveyed from the cross sealing station 40 into a plurality of stacks. The stacking arrangement is described in more detail below.

THE LONG SEALER

Figure 4:
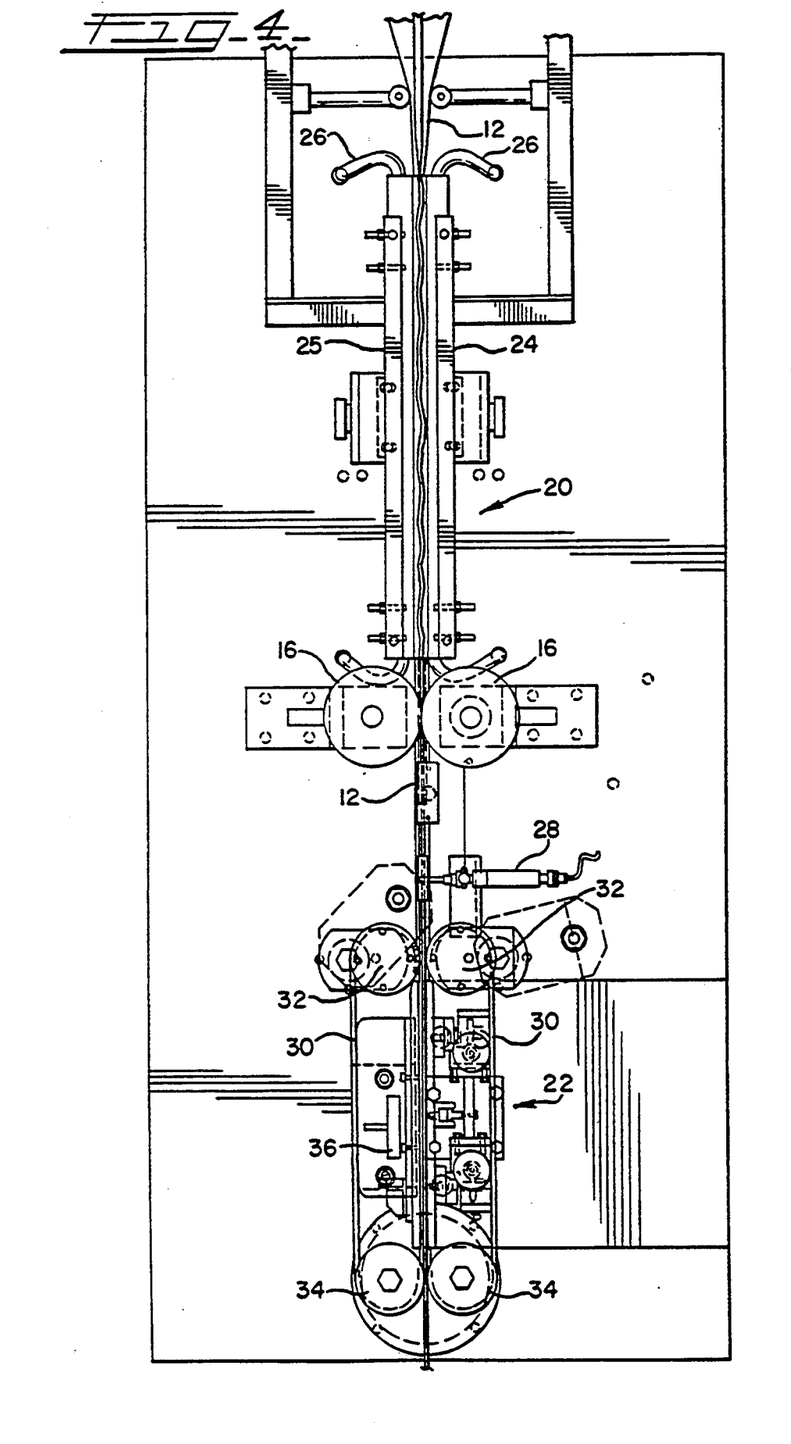
FIG. 4 is an illustration of a preferred embodiment the longitudinal sealer and flattening means of the present invention.
Figure 8:
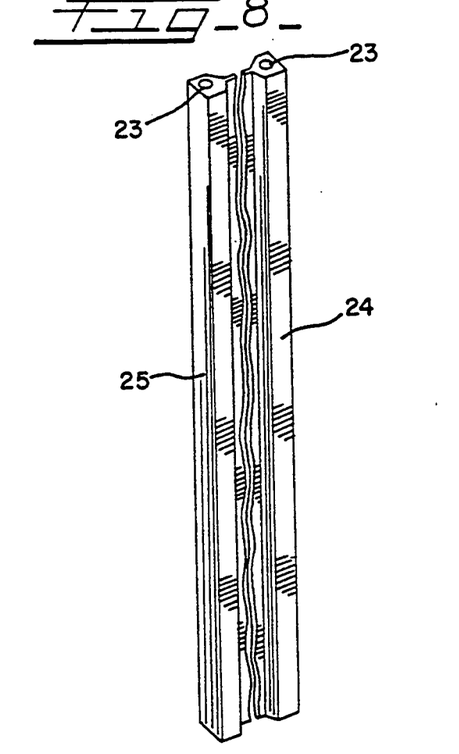
FIG. 8 is an illustration of a preferred embodiment of the longitudinal sealer of the present invention.

Referring now specifically to FIGS. 4 and 8, a preferred embodiment of the longitudinal sealing arrangement 20 and the flattening arrangement 22 are illustrated.

The preferred embodiment of the longitudinal or long sealing arrangement 20 provides a novel and advantageous apparatus and process for forming the longitudinal seal in the web without stopping the web in an intermittent fashion. The sealing station 20 includes a pair of stationary heated plates 24, 25. Each plate includes an undulating surface which forms an important part of the longitudinal sealer 20. The undulating surfaces of the plates 24, 25 are opposed and the plates 24, 25 are disposed such that a fixed gap or distance exists between the opposed undulating surfaces. The gap between the undulating surfaces of the plates 24, 25 is fixed such that as the front and rear sheets of the open longitudinal edge of the web are conveyed between the undulating surfaces, the front and rear sheets of the web are forced into intimate contact with each other.

In a preferred embodiment the gap between the undulating surfaces is tapered having a wider gap at the top than the bottom with an average gap distance of approximately 1/32 of an inch when high density polyethylene is used for the web material. An average gap distance of approximately 1/16 of an inch is desired when polypropylene is used for the web material. The gap distance is dependent on such factors as the thickness of the slice, the machine speed, and the type of film used to wrap the slice. Means are provided for heating the two plates to a temperature sufficient to form a longitudinal hermetic seal as the web is conveyed between the two plates 24 and 25 without physically clamping the two surfaces together. The heating may be provided by any suitable heating means, for example, an electric heater 26 which is inserted longitudinally through an aperture 23 in each plate 24, 25. The plates are heated to a temperature sufficient to form a hermetic seal between the two sheets of the web, for example, the plates may be heated to a temperature of approximately 230°–240° F. when high density polyethylene is used for the web material. The plates may be heated to approximately 260° F. when polypropylene is used for the web material. Nip rollers 16 are provided after the sealing plates station 20 to secure the seal and pull the web through the longitudinal sealer.

In a preferred embodiment, the fill tube 12 extends down into the web such that the exiting edge of the fill tube 12 is disposed after the nip rollers 16. In this manner, the cheese is inserted into the web after the longitudinal seal has been formed and a tube has been defined.

In a preferred embodiment, a bubble control element 28 is disposed before the flattening station 22. The bubble control unit 28 functions to determine the amount of cheese which is being inserted into the web. In this manner, the flow of cheese may be controlled as appropriate for the speed of the web and the desired thickness and weight of the slice. After the cheese is inserted into the tubular web, the tubular web is conveyed to a flattening station 22. The flattening station 22 includes a first or upper set of juxtaposed rollers 32, a lower set of Juxtaposed rollers 34, and a pair of opposed belts 30. Each belt 30 is disposed around one set of rollers 32, 34. As the web with the cheese inserted therein passes between the two belts, the cheese is flattened to form a web comprising the tubular thermoplastic film and a continuous slice of cheese. Means 36 are provided in the flattening station 22 for adjusting the distance between the belts 30 to control the thickness of the web of tubular thermoplastic material and cheese.

Figure 3:
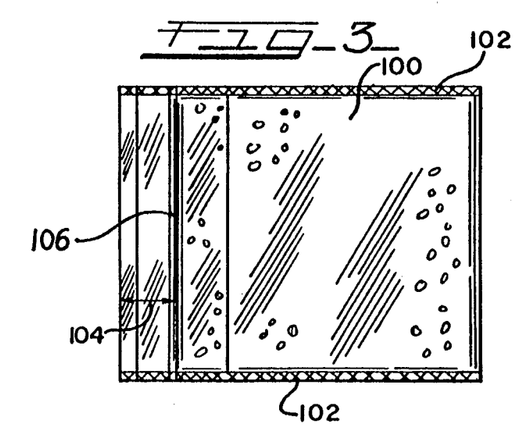
FIG. 3 illustrates the slice of cheese illustrated in FIG. 2 with the flap unfolded.

As illustrated in FIG. 3, the web is formed into a tubular section with a hermetically sealed longitudinal seal 106. Preferably, the web is sealed along the top longitudinal edge of the front face of the web such that a flap portion 104 is located between the arrows as illustrated in FIG. 3.

Figure 2:
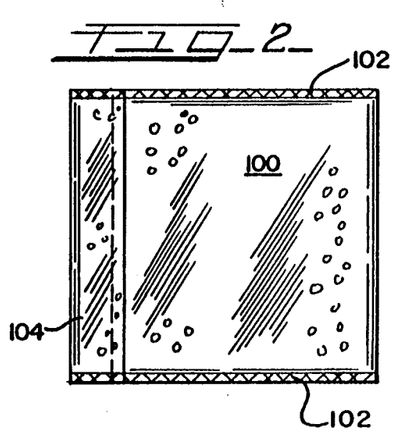
FIG. 2 illustrates a preferred embodiment of a slice of cheese which has been sealed with the process and apparatus of the present invention (with the flap folded over).

After the longitudinal seal 106 is formed, the web is conveyed through the cooling station 14, as described above, and then the flap 104 is folded over onto the front face of the web as illustrated in FIG. 2. The flap may be folded over in a manner known in the art before the web reaches the cross-sealing station 40. Preferably, the flap 104 is partially sealed at the cross seal sections to the front face of the web at the cross sealing station 40.

THE CROSS SEALING STATION

Figure 5:
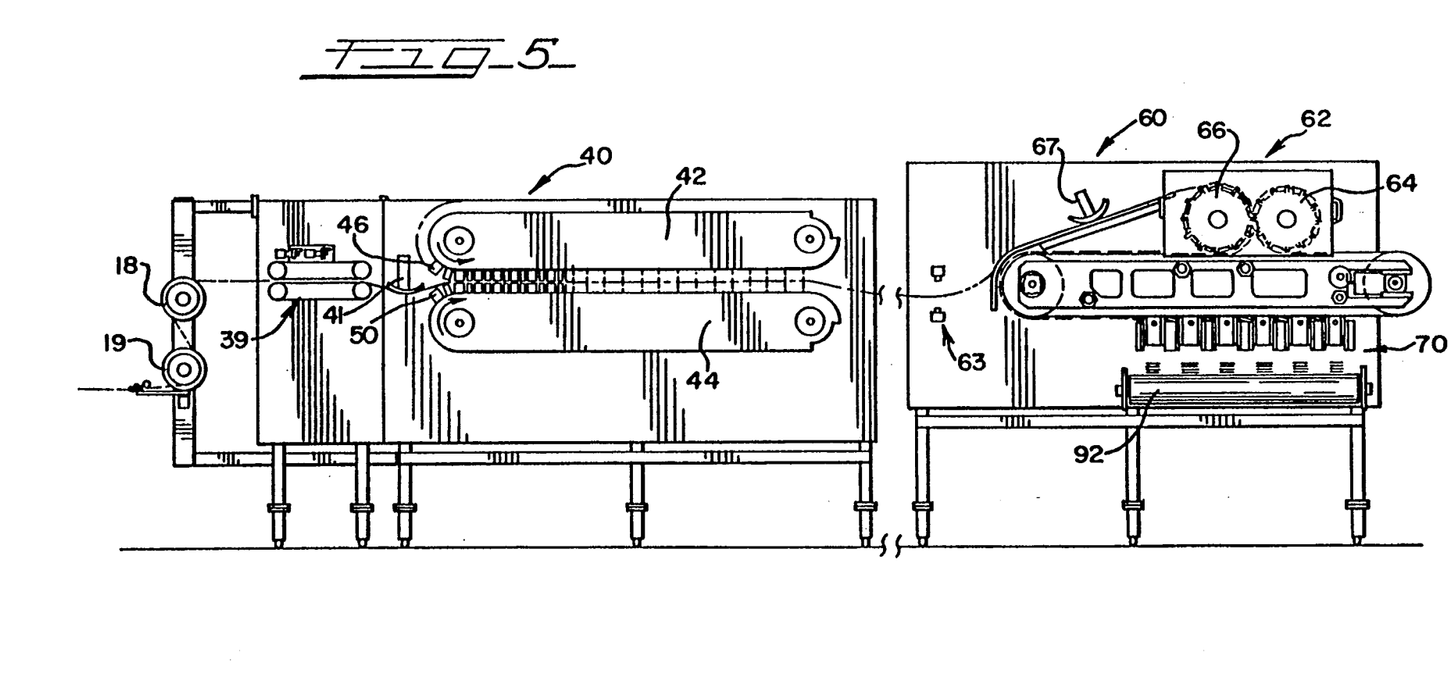
FIG. 5 is a schematic representation of the cross sealer and stacker illustrated in FIG. 1.
Figure 9:
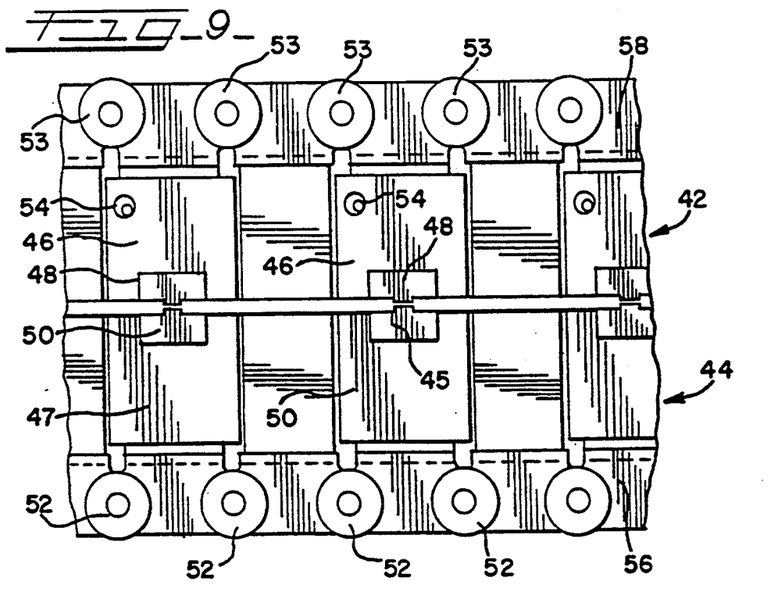
FIG. 9 illustrates an enlarged side view of a section of the cross sealing arrangement illustrated in FIG. 1.

Referring now specifically to FIGS. 5 and 9, a preferred embodiment of the cross-sealing arrangement is disclosed. The cross-sealing arrangement includes an upper sealing member 42 and a lower sealing member 44, with each of the sealing members including a plurality of opposed jaws or cleats 46 and 50 respectively. As best illustrated in FIG. 9, the sealing members 42 and 44 are arranged such that as the web is conveyed through the sealing station 40 between the upper cleat 46 and the engaging lower cleat 50 the top and bottom layers of the film web are urged into intimate contact with each other at a plurality of cross-sealing zones while the web is continuously moved forward in the desired cross sealing section. The cleats 46 of the upper member 42 are heated to the sealing temperature, in a manner known in the art. For example, the top cleat 46 may be heated by an electrical heater and brush arrangement. The cleats 46 and 50 may be made of any suitable material such as aluminum. The top cleat 46 preferably includes a removable section 48. The engaging bottom cleat 50 also preferably includes a removable section 45, which is made of a softer material than the top mating section 48 of the cleat 46. For example, the removable section 48 of the top cleat 46 may be made of a metallic material such as aluminum and the removable section 45 of the lower cleat 50 may be made of a resilient material such as silicone or polyurethane. Silicone is preferably used when high density polyethylene is the web material and polyurethane is the preferred material when polypropylene is the web material.

For purposes of quality control and to achieve uniformity in the cross seals, each of the heated cleats 46 includes a central temperature control having a microprocessor to control the current a power module supplies to each individual cleat. In another embodiment, individual thermostats 54 may be used to control the temperature of each individual cleat. Therefore the temperature of each cleat can be adjusted separately.

Means are provided for urging the two opposed cleats to engage the web of cheese as it is conveyed through the sealing station 40. As illustrated in the figures, in the preferred embodiment, the means for urging the cleat together comprises a track and chain arrangement. Each of the cleats is attached to a chain arrangement which rides on a track 56, 58. The chain arrangement, illustrated best in FIG. 9, includes sections of chain including rollers 52 and 53 which are attached at spaced intervals to the links of the respective chain. The rollers 52, 53 ride on elongated circular tracks 56, 58, respectively. The elongated circular tracks 56, 58 are disposed such that the cleats 46 and 50 ride in engaging relationship for a predetermined interval such that when cleats 46 and 50 are in an engaging relationship heat is applied to the plurality of cross-sealing zones (discussed in more detail below).

Preferably the web of cheese in the tubular film is conveyed through the opposed jaws 46, 50 of the sealing members 42, 44 such that a hermetic seal is formed between the two inner layers of the web material. More preferably, the seal is formed such that when after the seal has been made and the package is pulled apart at the seal, the seal will break. This is opposed to the seals which are presently made wherein after the seal has been formed and the package is pulled apart, the seal is broken by delamination, that is, by breaking the bond between the top non-sealing layer of and the inner or sealing layer of the sheet of the web. This preferred packaging arrangement is achieved by proper selection of the thermoplastic material. For example, one preferred material to be used for processed cheese with or without preservatives comprises a high density polyethylene (HDPE) layer coextruded with a polyethylene sealant layer with an intermediate adhesive layer.

While a high density polyethylene layer coextruded with a polyethylene sealant layer with an intermediate adhesive layer is the preferred packaging material for cheese, other materials can be used for packaging cheese with the present invention. One group of materials are manufactured by coextruding multiple layers as described previously. The materials can comprise 1) a polypropylene layer coextruded with a polyethylene sealant layer with an intermediate heat activated adhesive layer; 2) a high density polyethylene layer coextruded with an oxygen barrier layer with an intermediate heat activated adhesive layer; or 3) a polypropylene layer coextruded with an oxygen barrier layer with an intermediate heat activated adhesive layer. An oxygen barrier layer such as EVOH, Saran, etc. may be employed with meats and food products that do not contain food preservatives.

Another group of packaging materials can be used which comprise layers which are laminated to each other in a manner well known in the prior art. These materials include 1) a polyester layer laminated to a heat activated sealant layer; 2) a metallized polyester layer laminated to a heat activated sealant layer; 3) a nylon layer laminated to a heat activated sealant layer; 4) a cellophane layer laminated to a heat activated sealant layer; 5) a polycarbonate layer laminated to a heat activated sealant layer; and 6) an acrylic nitrile layer laminated to a heat activated sealant layer.

Though the two groups of materials are to be used to package cheeses, they may also be used to package many foods such as 1) processed cheese with or without preservatives; 2) cheese blends; 3) pizza toppings; 4) cheese and meat blends; 5) cheese, meat, and condiments blends; 6) mayonnaise; 7) peanut butter; 8) ketchup; 9) bar-b-que sauce; and 10) cheese and eggs. The 10 groups of foods listed above may also be packaged by a propylene layer coextruded with a polyethylene sealant layer with an intermediate adhesive layer.

When high density polyethylene is the web material, the sealing temperature is between 230° F. and 240° F. and the jaws travel with the web from the first point of engagement to the point of disengagement for approximately ½ to 1 second in a preferred embodiment. In another embodiment, the sealing temperature is between 260° and 280° when polypropylene is the web material. The pressure exerted between the two opposing jaws on the sealing section 106 is such that intimate contact between the two layers of film is maintained so that substantially all of the cheese is removed from between the two layers of the thermoplastic web material in the cross-sealed areas while. This results in a slice of cheese to be defined between adjacent contacting zones of the web. Thus, the cheese completely occupies the interior of the volume of space defined by the hermetically sealed web.

Suitable means are provided for driving the two chain arrangements in the sealing members 42 and 44. The slices of cheese are defined in the section between the jaws. Preferably, the sealing section of the jaws 46 and 50 are such that the cross seal 102 between adjacent cheese slices 100 is approximately ¼ of an inch. The cleats 46, 50 are spaced in their respective chains such that the distance from the beginning of one slice to the beginning of the next slice (including the cross-seal sections 102) is approximately 3½ inches.

This arrangement allows for high speed production of the individual slices of cheese 100. Since the heating cleats 46 and the mating 50 ride or move along with the cross seal for a fixed period of time, the web may be continuously moved at a relatively fast pace providing a rapid production rate. For example, the web may be moved at approximately 300 feet/minute or such that over approximately 1,000 slices are produced per minute.

THE CUTTING AND STACKING ARRANGEMENT

Figure 6:
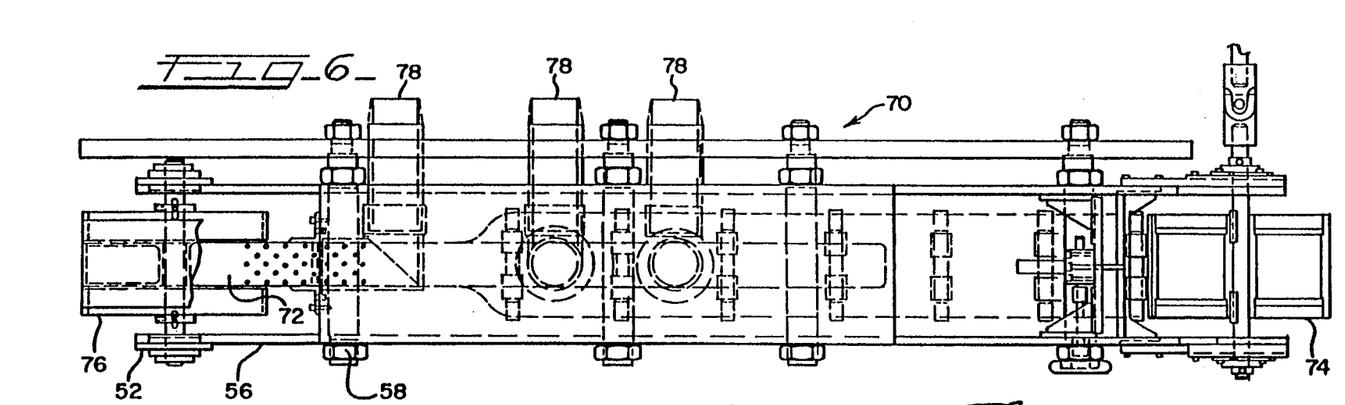
FIG. 6 is a top view of a preferred embodiment of the stacker illustrated in FIG. 1.
Figure 7:
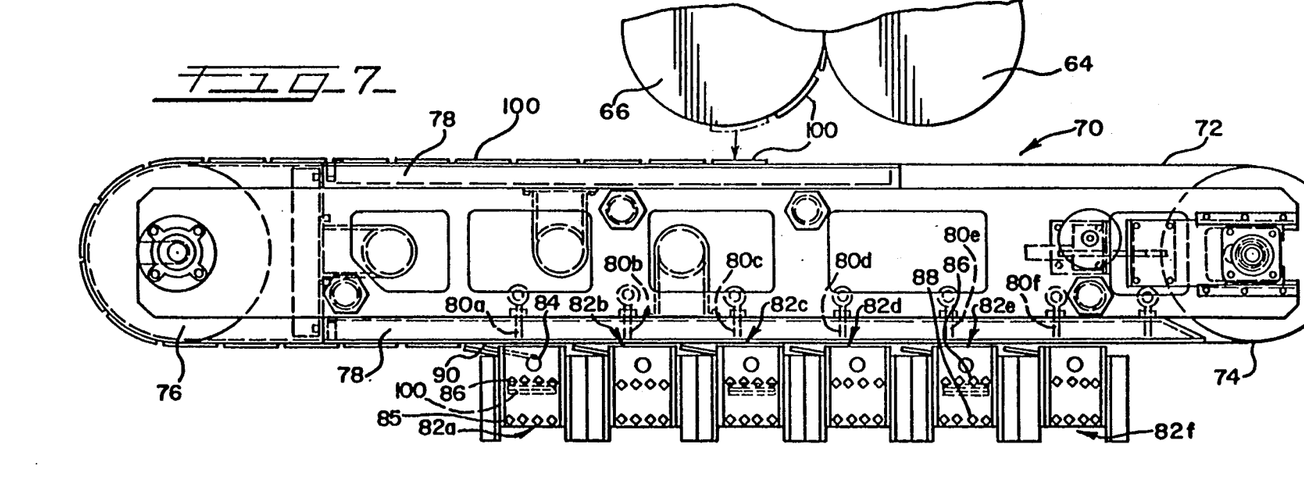
FIG. 7 illustrates a side view of the preferred embodiment of the stacking arrangement illustrated in FIGS. 1 and 6.

After the cross seals 102 have been formed, the web is then conveyed to a cutting station 62. Loop control means 63 and tensioning means 67 are also provided. Referring specifically to FIGS. 5 and 7, the cutting station includes a pair of spindles 64, 66 with means for severing the web at the cross seals such that individual slices are defined. After the web has been cut to form the individual slices, the slices of cheese 100 are ready to be stacked into individual stacks for packaging. The slices 100 are discharged from the cutting section 62 and disposed on the stacker 70. Referring now specifically to FIGS. 6 and 7, a preferred embodiment of the stacker of the present invention is disclosed. The stacker 70 provides an efficient way for selectively stacking a predetermined number of the cheese slices 100 being produced by the previously discussed forming, sealing and cutting arrangement into a plurality of stacks.

The stacking arrangement 70 comprises a porous conveyor belt, which is preferably in the form of an endless belt 72. Preferably, the endless belt 72 include a plurality of apertures such that the belt 72 is approximately 25% or more open. A vacuum system 78 is provided on the inside of the endless belt 72 such that the slices of cheese 100 are maintained on the outside surface of the endless belt 72 by the atmospheric pressure differential pressure created by the vacuum system 78. Preferably the endless belt 72 rotates about two rollers or drums 74 and 76 which are rotated by means known in the art. The vacuum system 78 provides sufficient vacuum such that the slices of cheese 100 adhere to the surface of the belt 72 as the belt is advanced. That is, the slices of cheese 100 are maintained on the belt as the belt travels around the drum 76 and further are maintained even in an upside down position as the slices 100 travel around and are disposed on the bottom of the stacker 70. Thus, the vacuum of the vacuum system 78 is sufficient to overcome the force of gravity pulling the slice of cheese 100 down when it is on the bottom of the belt 72.

A plurality of stacking locations 82a-82f are provided to accommodate the rapid production rate of the wrapping system described above.

An air ejector 80a-80f is provided at the front of each stacking location 82a-82f. The air ejector 80a-80f, when actuated, applies air pressure at the leading edge of the cheese slice 100 as it travels on the belt 72. The ejector 80a-80f provides the positive air pressure through the apertures of the belt as the slice passes under it to thereby override the vacuum and "peel off" the cheese slice 100 as it is being conveyed past the ejector 80a-80f. In this manner, the force of gravity releases the slice 100 into the desired stacking location. Preferably, an inclined plate or ramp plate 90 is provided before the front edge of each stacking location 82a-82f. This ramp plate 90 assures that if the cheese slice 100 is released from the conveyor belt 70 before it is fully in the stacking location, the cheese slice 100 will slide onto the plate 90 and be conveyed into the stacking location. A photo sensor 84 is provided at the beginning of the stacking location for programming the number of slices 100 to be dropped at each stacking location 82.

In a preferred embodiment, a particularly advantageous stacking system is configured such that an intermediate slice receiving means is used to temporarily hold the first few slices being dropped into the stacking location 82. In one preferred embodiment, the intermediate slice receiving means comprises a first or upper set of retractable fingerlike members 86. Preferably, a lower set of retractable fingerlike members 88 are also provided. The upper set of retractable fingers 86 are disposed at an intermediate level between the top of the particular stacking location and the bottom of the stacking location. This upper set of stacking fingers 86 acts as an intermediate landing stop for the cheese slices 100 as they are peeled off into the particular stacking location. After a predetermined number of slices have fallen on to the upper set of fingers 86, the fingers 86 are retracted such that the slices of cheese 100 which were stacked in the particular stacking locations fall onto the lower set of fingers 88. The lower set of fingers 88 is particularly important where the number of slices 100 that is to be stacked in each stacking location is large. For example, some projects may require as much as a four inch stack of slices of cheese 100. The advantages of the upper set of fingers 86 are best illustrated by describing the trajectory of the cheese slices 100 if this upper set of retractable fingers 86 were not present. As the slice 100 would be peeled off by the ejector 80, the slice 100 would begin to fall at an angle with the leading edge of the slice 100 having the lowest position. If the slice 100 were to fall a sufficient distance, it would tumble rather than being flatly deposited in an orderly fashion thereby disrupting the stacking process. The upper fingers 86 provide an intermediate stop for the slices 100. The slice 100 only falls a short distance to the upper set of finger 86. Thus, the stability of the stack is maintained.

After a number of 100 slices have been disposed on to the upper set of fingers 86, the upper retractable fingers 86 are retracted and the entire stack of slices 100 falls onto the lower set of retractable fingers 88. Since a number of slices 100 have already been deposited on the stack, the slices 100 which are now being peeled off from the conveyor 72 and dropped onto the existing stack of slices 100 will have a shorter distance to fall. That is, the distance that a falling slice 100 will have to fall will only be the distance between the conveyor belt 70 and the top of the stack. After all of the slices 100 that are to be included in a particular stack have been stacked, the lower set of retractable fingers 88 is retracted and the stack of slices 100 falls onto the conveyor table 92.

In another preferred embodiment, the intermediate slice receiving means may comprise an elevator arrangement which is initially raised to a predetermined intermediate height and is lowered to accommodate the rate at which the slices are being stacked in the stacking locations. Preferably, in this embodiment, the elevator is lowered to deliver the stack to a conveyor table 92 after the last slice 100 has been dropped in the stack.

Preferably means such as a programmable controller or microprocessor are operatively connected to the respective ejectors 80a-80f at each stacking location 82a-82f such that the number of slices 100 in the stacks 82a-82f can be selectively adjusted. The controlling means will also make it possible to only fill certain stacking locations and eliminate other stacking locations. In one particularly advantageous embodiment, the ejectors 80a–80f and the control means are operatively configured such that each stacking location 82a through 82f is successively or sequentially filled. In this embodiment, before any of the stacking locations 82a–82f have been filled, all of the ejectors provide positive pressure at the front edge of each stacking location. As the slice 100 is conveyed past the first ejector 80 (corresponding to the first stacking location 82a), the first ejector 80 provides positive pressure to peel the slice 100 off the conveyor belt 72 and into the first stacking location 82a. After the predetermined number of slices 100 have been dropped into the first stacking location 82a, the positive pressure provided by the ejector means 80a at the first stacking location is terminated. Thus, the vacuum pressure from the vacuum means 78 will continue to hold the next slice 100 on the conveyor belt 72 until it reaches the ejector 80a at the second stacking location 82b. The ejector 80b at the second stacking location 82b will continue to operate until the second stack has been filled with the predetermined number of slices. After the second stack has been filled, the ejector 80b at the beginning of the second stacking location 82b will be turned off and thus the next slice 100 will be conveyed to the third stacking location 82c. This process will continue until the predetermined number of slices for each stacking location is complete. This process is particularly advantageous since the vacuum system does not have to be repeatedly disengaged. The air ejectors override the vacuum without the need to discontinue its operations.

Preferably, as illustrated in FIGS. 1 and 5, the stacks from each individual location 82a through 82f are disposed onto another conveyor 92 which is disposed such that it advances in a direction transverse to the direction of movement of the endless belt 72 of the stacker 70. In this manner, the stacks of the slices 100 are conveyed away from the stacker 72 to a location where they may be further processed either manually or automatically.

Therefore, the packaging and stacking system of the present invention provide a means for hermetically packaging individual slices of cheese at an efficient and rapid production rate. The sealing arrangement provided by the present invention provides a hermetic seal along the longitudinal edge of the web. After the cheese is inserted in the tubular web, hermetically sealed cross seals are formed. This arrangement provides a hermetically sealed package of cheese which will have a substantially longer shelf life than the presently available sliced cheese products. Additionally, the longitudinal seal and the cross seals are provided in a manner which permits continuous movement of the web without the intermittent action of some presently available sealing systems. The slice which is produced and packaged according to the present invention provides a preferred final packaged product. The seal is formed between the two inner layers of the low thermal melt material such that the seal is broken when the packaging materials are pulled apart to open the individual slice. Unlike presently available packages, wherein the sealing layer is delaminated from the top layer of the packaging material and when the package is opened a rough tear is made which leads to "stringing". With the package of the present invention, the bond is broken between the two sealing layers of polyethylene and a nice clean opening is provided which eliminate the stringing problem.

Additionally, since the polyethylene may be used as the sealing layer, the packaging material is easily released from the processed cheese. This obviates the need for items such as a shear pump to process the cheese so as to have a less cohesive texture and provide a better release. The process and apparatus of the present invention also permit the top layer of the packaging material to be made of a high density polyethylene material. This is particularly advantageous since high density polyethylene is less expensive than presently used materials such as MYLAR.

The present invention also provides an efficient stacker which takes slices produced by a relatively rapid production machine and stacks the slices in a plurality of stacks. The number of slices may be selectively varied in the stacking locations allowing for greater control in the production process.

The foregoing description of the preferred embodiments of the present invention has been presented for purposes of illustration and description. The described embodiments are not intended to be exhaustive or to limit the invention to the precise form disclosed. Obviously many modifications and variations are possible in light of the above teachings. The embodiments which were described were chosen in order to best explain the principles of the invention and its practical applications. It is intended that the scope of the invention be defined by the following claims, including all equivalents.

We claim:

1. A process for packaging a food item formed into a soft mass wherein the food item is wrapped in individual slices comprising:

folding a continuous web of heat-sealable thermoplastic material into folded condition including a fold, a folded longitudinal first side and an open longitudinal second side, the web on one side of the fold defining a front sheet and the web on the other side of the fold defining a rear sheet;

continuously moving the web in a forward direction;

forming a longitudinal hermetic seal along the open longitudinal side of the web in folded condition to define a continuous tubular web, the longitudinal hermetic seal being formed in a continuous manner as the web is continuously moved forward;

inserting the soft mass food item into the tubular web;

after the food item is inserted, flattening the web to form a continuous slice of the food item disposed between front sheet and the rear sheet of the web;

urging the front and rear sheets of the web together at predetermined intervals to define cross-sealing zones by applying sufficient pressure at the cross-sealing zones to remove substantially all of the food item from between the front and rear sheets, the cross-sealing zones extending from the first longitudinal side to the second longitudinal side of the web; and forming a plurality of hermetically sealed cross-seals at the cross-sealing zones while the web is continuously moved forward by heating the web at the cross-sealing zones for a period of time sufficient to hermetically seal the web together across the cross-sealing zones, to form hermetically sealed slices of the food item.

2. The process of claim 1 wherein the food item comprises cheese.

3. A process for packaging a food item wherein the food item is wrapped in individual slices by inserting the food item into a continuous plastic web, comprising:

forming a food item into a soft mass;

providing a web of thermoplastic material;

arranging the web of thermoplastic material to have a front sheet and a rear sheet in folded condition, wherein the front and rear sheets each have an outer surface and an inner sealing surface, and wherein the web in folded condition has a folded longitudinal first edge and an open longitudinal second edge;

moving the web continuously in a forward direction;

conveying the web in folded condition to a longitudinal sealing station;

forming a longitudinal hermetic seal along the longitudinal second edge of the web, the longitudinal hermetic seal being formed between the inner sealing surface on the front sheet of the web and the inner sealing surface on the rear sheet of the web so as to form a tubular web of plastic;

inserting the soft mass food item into the tubular web of plastic;

moving the web continuously in a forward direction;

continuously flattening the web with the inserted food item such that a continuous slice of the food item is formed between front and rear sheets of the plastic web;

after the web has been flattened and during substantially continuous forward movement of the web, urging opposing portions of the front and rear sheets of the web into intimate contact with each other at a plurality of cross-sealing zones extending continuously between the first and second longitudinal edges of the web, the opposing portions of the front and rear sheets of the web being urged together at the cross-sealing zones at a pressure sufficient to maintain intimate contact between them and to remove substantially all of the food item from the cross-sealing zones;

applying heat to the cross-sealing zones in a conductive manner for an amount of time, and at a sufficient temperature, to form hermetic cross-seals extending continuously between the first and second longitudinal edges of the folded web;

the folded longitudinal first edge, the hermetically sealed longitudinal second edge, and the hermetic cross-seals thereby providing a food item enclosed within a hermetically sealed package.

4. The process of claim 3 wherein the food item comprises cheese.

5. An apparatus for packaging a food item wherein the food item is wrapped in individual slices comprising:

a food former providing a food item with a soft mass;

a device for folding a continuous web of plastic material into folded condition, the folded web including a front sheet and a rear sheet joined by a fold at a bottom longitudinal edge, and having an open top longitudinal edge, the front sheet and the rear sheet each having an outer layer and an inner sealing layer;

a longitudinal sealing station including a positioner positioning the front sheet and the rear sheet such that, at the open top longitudinal edge of the web, the inner sealing layer of the front sheet faces the inner sealing layer of the rear sheet, and a longitudinal sealer forming a longitudinal hermetic seal as the web is continuously moved, the longitudinal hermetic seal extending continuously along the top longitudinal edge of the web and joining the inner sealing layers of the front and rear sheets of the web, thereby defining a continuous tubular web of plastic material;

a food introducer for inserting the food item into the continuous tubular web of plastic material;

a flattening device continuously flattening the tubular web with the inserted food item inside the web such that a continuous slice of the food item is defined between the front sheet and the rear sheet of the web;

a cross-sealing station disposed downstream of the longitudinal sealing station, the cross-sealing station including opposing pairs of heated cleats arranged to receive the web between the cleats, the cleats applying sufficient pressure at cross-sealing zones to remove substantially all of the food item between the front and rear sheets of the flattened web at the cross-sealing zones, the cross-sealing zones extending continuously from the bottom longitudinal edge to the top longitudinal edge of the folded web, and the cleats applying heat conductively to the web at the cross-sealing zones as the web is continuously moved, wherein the heat is applied to the cross-sealing zones for an amount of time sufficient to hermetically seal the inner sealing layers of the front and rear sheets together at the cross-sealing zones to thereby provide a hermetically sealed package.

6. The apparatus of claim 5 wherein the food former forms cheese into a soft mass.

7. The process of claim 1, wherein said step of forming a longitudinal hermetic seal comprises applying heat in a conductive manner to said web.

8. The process of claim 3, wherein said step of forming a longitudinal hermetic seal comprises applying heat in a conductive manner to said web.

9. The apparatus of claim 5, wherein said longitudinal sealing station applies heat to said web in a conductive manner.

10. A process for packaging a food item formed into a soft mass wherein the food item is wrapped in individual slices comprising:

providing a heat sealable continuous web consisting essentially of a nonmetallic material;

folding the heat sealable continuous web into a folded condition including a fold, a folded longitudinal first side and an open longitudinal second side, the folded web on one side of the fold defining a front sheet and on the other side of the fold defining a rear sheet;

continuously moving the web in a forward direction;

forming a longitudinal hermetic seal along the open longitudinal side of the web in folded condition to define a continuous tubular web, the longitudinal hermetic seal being formed in a continuous manner as the web is moved forward;

inserting the soft mass food item into the tubular web;

continuously flattening the web with the inserted food item such that a continuous slice of the food item is formed between front and rear sheets of the folded web;

forming cross-sealing zones extending continuously between the longitudinal first and second sides of the folded web at predetermined intervals in the web transverse to the longitudinal sides., the cross-sealing zones being formed by the application of pressure at the cross-sealing zones sufficient to remove substantially all of the food item from between the front and rear sheets of the web at the cross-sealing zones; and forming a plurality of hermetically sealed cross-seals at the cross-sealing zones by applying heat to the cross-sealing zones for a predetermined amount of time while the web is continuously moved forward, the predetermined amount of time being sufficient to form hermetic seals at the cross-sealing zones and to thereby provide slices of the food item enclosed within hermetically sealed non-metallic packages.

11. The process of claim 10 wherein the food item comprises cheese.

12. An apparatus for packaging a food item wherein the food item is wrapped in individual slices comprising:

a food former providing a food item with a soft mass;

a device for folding a continuous web of plastic material into folded condition, the folded web including front and rear sheets joined by a fold at a bottom longitudinal edge, and an open top longitudinal edge, the front sheet and the rear sheet each having an outer surface and an inner sealing surface;

a longitudinal sealing station including a positioner positioning the front sheet and the rear sheet such that, at the open top longitudinal edge of the web, the inner sealing surface of the front sheet faces the inner sealing surface of the rear sheet, and a longitudinal sealer continuously forming a longitudinal hermetic seal near the top longitudinal edge of the web between the inner sealing surfaces of the front and rear sheets of the web as the web is continuously moved, thereby defining a continuous tubular web of plastic material;

an inserter inserting the food item into the continuous tubular web of plastic material;

a flattener for flattening the web containing the inserted food item to form a continuous slice of the food item between the front and rear sheets of the folded web;

a cross-sealing station disposed downstream of the longitudinal sealing station, the cross-sealing station including a cross-sealer for applying sufficient pressure at cross-sealing zones extending between the bottom longitudinal edge and the longitudinal hermetic seal to remove substantially all of the food item from between the front and rear sheets of the web at the cross-sealing zones, the cross-sealer also applying heat to the web at the cross-sealing zones as the web is continuously moved, wherein the heat is applied to the cross-sealing zones for an amount of time sufficient to hermetically seal the inner sealing surfaces of the front and rear sheets together at the cross-sealing zones, thereby providing slices of the food item enclosed by a hermetically sealed plastic package; and a drive continuously conveying the web to the longitudinal sealing and cross-sealing stations.

13. The apparatus of claim 12, wherein the food item comprises cheese.

* * * * *

(12) EX PARTE REEXAMINATION CERTIFICATE (5906th)
United States Patent
Meli et al.

(10) Number: US 5,440,860 C1
(45) Certificate Issued: Oct. 2, 2007

(54) METHOD AND APPARATUS FOR FORMING AND HERMETICALLY SEALING SLICES OF FOOD ITEMS

(75) Inventors: Vincent Meli, Green Bay, WI (US); Michael A. Matharani, DePere, WI (US); Ted A. Brzezinski, Green Bay, WI (US); David L. Shaft, Green Bay, WI (US); James L. Urmanski, Green Bay, WI (US)

(73) Assignee: Schreiber Technologies, Inc., Lakeville, MN (US)

Reexamination Request:
No. 90/006,923, Jan. 27, 2004

Reexamination Certificate for:
Patent No.: 5,440,860
Issued: Aug. 15, 1995
Appl. No.: 08/098,752
Filed: Jul. 28, 1993

Related U.S. Application Data (63) Continuation of application No. 07/791,490, filed on Nov. 12, 1991, now abandoned, which is a continuation-in-part of application No. 07/644,481, filed on Jan. 18, 1991, now Pat. No. 5,114,307, which is a continuation of application No. 07/361,405, filed on Jun. 5, 1989, now abandoned.

(51) Int. Cl.
*B65B 7/02* (2006.01)
*B65B 9/06* (2006.01)
*B65B 51/10* (2006.01)

(52) U.S. Cl. ............... 53/451; 53/122; 53/374.5; 53/477; 53/551; 426/130; 426/414

(58) Field of Classification Search ............... None
See application file for complete search history.

(56) References Cited

U.S. PATENT DOCUMENTS

| | | | |
|---|---|---|---|
| 2,146,831 A | 2/1939 | Maxfield |
| 2,160,367 A | 5/1939 | Maxfield |

(Continued)

FOREIGN PATENT DOCUMENTS

| | | |
|---|---|---|
| GB | 694377 | 7/1953 |
| GB | 827792 | 2/1960 |
| GB | 899176 | 6/1962 |
| GB | 1055803 | 1/1967 |
| GB | 1145199 | 3/1969 |
| GB | 1366798 | 9/1974 |
| GB | 1440317 | 6/1976 |
| GB | 1444374 | 7/1976 |
| GB | 1566177 | 4/1980 |
| GB | 1569112 | 6/1980 |
| GB | 2179620 | 3/1987 |
| JP | 5-49536 | 7/1993 |
| JP | 5-49537 | 7/1993 |
| JP | 5-79572 | 7/1993 |

OTHER PUBLICATIONS

R. Farkas, Heating Sealing, Reinhold Publishing Corp., 1964.
The Wiley Encyclopedia of Packaging Technology, John Wiley & Sons, 1986.
1986–87 Modern Plastics Encyclopedia.

(Continued)

*Primary Examiner*—Matthew C. Graham (57) ABSTRACT

An apparatus and method are provided for forming a hermetically sealed package for a slice of a food item. A web of thermoplastic material is first formed into a tubular arrangement with a hermetic longitudinal seal. To form the tubular arrangement, means are provided for folding a continuous web of thermoplastic material into V-folded condition and for continuously forming a hermetic seal along the open longitudinal edge of the V-folded web. The hermetic seal is formed between the inner surfaces of the front and rear faces of the web to define a tubular web member. The food item which has been formed into a soft mass, is then inserted into the tubular member and the tubular member is flattened to form a thin film tube. Means are provided for forming a hermetically sealed cross-seal which are disposed substantially transverse to the longitudinal forward moving direction of the web.

U.S. PATENT DOCUMENTS

| | | | |
|---|---|---|---|
| 2,686,128 A | 8/1954 | Conti | |
| 2,686,744 A | 8/1954 | Cornwell | |
| 2,759,308 A | 8/1956 | Nawrocki | |
| 2,916,864 A | 12/1959 | Meissner | |
| 3,001,348 A | 9/1961 | Rado | |
| 3,324,621 A | 6/1967 | Runge | |
| 3,397,101 A | 8/1968 | Rausing | |
| 3,445,324 A | 5/1969 | Curler et al. | |
| 3,511,436 A | 5/1970 | Kessler | |
| 3,542,570 A | 11/1970 | Bush et al. | |
| 3,655,503 A | 4/1972 | Stanley et al. | |
| 3,673,041 A | 6/1972 | Schulz et al. | |
| 3,879,492 A | 4/1975 | Bontinick | |
| 4,015,021 A | 3/1977 | Harima et al. | |
| 4,055,672 A | 10/1977 | Hirsch et al. | |
| 4,067,175 A | 1/1978 | Vinokur | |
| 4,069,348 A | 1/1978 | Bush | |
| 4,147,827 A | 4/1979 | Breedt, Jr. et al. | |
| 4,297,415 A | 10/1981 | Ward et al. | |
| 4,394,204 A * | 7/1983 | Hutcheson | 156/275.1 |
| 4,421,823 A | 12/1983 | Theisen et al. | |
| 4,637,199 A | 1/1987 | Steck et al. | |
| 4,656,068 A | 4/1987 | Raines | |
| 4,792,457 A | 12/1988 | Brna et al. | |
| 4,961,302 A | 10/1990 | Davis | |

OTHER PUBLICATIONS

Webster's Third New International Dictionary of the English Language Unabridged, including pp. 877, 1059 (1993).

Webster's II New College Dictionary, including p. 76 (1999, 1995).

Modern Packaging Encyclopedia—1970, frontispiece pages and including pp. 1–3, 5–8, 16–20, 126–133, 139–140, 144;146–149;154–155;162–164;179–190.

The Process Cheese Industry in the United States: A Review. J. Milk Food Technol., vol. 37, No. 3 (1974). I. Industrial Growth and Problems.

The Process Cheese Industry in the United States: A Review. J. Milk Food Technol., vol. 37, No. 3 (1974). II. Research and Development.

Laurel Electronics, Inc., Application No. AN–D002, "High–Speed Setpoint Control With Peak Capture", Oct. 28, 2001.

"The Wiley Encyclopedia of Packaging Technology," John Wiley & Sons, Inc. (United States), p. 199–201, 315–317, 320–325, 574–578, (1986).

Heck, William N., "The Utilization of Coextrusion Methods for the Manufacture of Packaging Film," Marschall Italian & Specialty Cheese Seminars, 1981–11 ed., p. 1–5, (1981).

Farkas, Robert D., "Heat Sealing," Reinhold Plastics Applications Series, Reinhold Publishing Corporation (United States), p. 29, (1964).

Swett, R. M., Modern Plastics Encyclopedia, p. 52, 59, 60, 62, 63, 72, 74.

Wright, Jim, "Some Aspects of Functional Cheese Packaging," Marschall Italian & Specialty Cheese Seminars, 1971–16 ed., p. 1–3, (1971).

"Brief on Appeal to the Board of Appeals," U.S. Patent Application 615,121, Bush et al; U.S. Patent No. 3,542,570, p. 1–19, (1970).

"Schrieber's Memorandum on Claim Interpretation," *Schreiber Foods, Inc. v. Galaxy Nutritional Foods, Inc.*, Eastern District Wisconsin Case No. 02 C0498.

"*Schreiber Foods, Inc. v. Beatrice Cheese, Inc.*," 31 Fed. Appx. 727, 2002 U.S. App. Lexis 4448 (United States), p. 1–5, (Feb. 27, 2002).

Sineath, Henry, "Expert Report of Henry Sineath," *Schreiber Foods, Inc. v. Borden, Inc.*, Eastern District Wisconsin Case No. 02–C–0293 (United States), p. 1–73, (Jan. 30, 2003).

Nawrocki, A., "A History of Individually Wrapped Cheese Slices," Marschall Italian & Speciality Cheese Seminars, 1979–36 ed., p. 1–6, (1979).

Meyer, Albert, Processed Cheese Manufacture, 1973, Food Trade Press, p. 8, 181–184, 321–328.

Carne, Josiah, "Slided Process Cheese Production: Advantages of a Complete System Technology, Personnel Training, Engineering and Equipment," Marschall Italian & Speciality Cheese Seminars, 1979–38, p. 1–5, (1979).

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *